June 29, 1965 C. M. ALLRED 3,192,372

SIGNAL-LEVEL COMPARING SYSTEM

Filed April 19, 1962

INVENTOR

Charles M. Allred

BY David Robbins

ATTORNEY

3,192,372
SIGNAL-LEVEL COMPARING SYSTEM

Charles M. Allred, Boulder, Colo., assignor to the United States of America as represented by the Secretary of Commerce

Filed Apr. 19, 1962, Ser. No. 188,912
7 Claims. (Cl. 235—193)

This invention relates to a system for comparing the output levels of a pair of sources that generate pulse, CW, random noise or other types of signals.

The relative strength of two signal levels is often desired. As the strength of the two signals decreases, the determination of this ratio becomes increasingly difficult. When the desired signals have levels that are approximately equal or smaller than the internal noise level of a very low noise amplifier, the problems become severe. This is due not only to the masking effect of the internal noise but because of the instability of the amplifier gain. This in turn arises from the enormous amounts of gain needed.

In conventional practice, a pair of sources, which are usually at very low levels, are fed alternately through a switch to a single amplifier. The output of the amplifier is fed alternately through another switch to a pair of square law detectors. The switches are synchronously operated at a sufficiently high rate so that gain variations of the amplifier do not take place over the switching time. The outputs of the two detectors are then made equal by adjusting the levels of one or both of the sources. Of necessity, this arrangement requires one or the other of the sources to be variable in level or an attenuator must be used with the one having the highest level. Such an attenuator must have setting values that are accurately known, in some cases have a very low insertion loss, and must not produce any noise but what is known or calculable. Other disadvantages: The noise of the amplifier is part of its output and adds to the output of the detectors. The switch with its noise, losses, or instabilities is usually a limiting factor, and the levels of operation must be as low as that of the source providing the lowest signal level being compared.

It is therefore an object of the present invention to provide a system for obtaining the relative output levels of two sources in an accurate, precise, and easily measured manner.

Another object is to provide a signal-level comparator in which the gain variations of the amplifiers employed do not enter into the results obtained.

Still another object is to provide a signal-level comparator utilizing a highly accurate piston attenuator which, because of its high initial insertion loss, cannot be used in the conventional system described above when the two signal levels to be compared do not differ greatly.

A further object is to provide a signal-level comparator which does not require that the levels of the signals being compared have, or be adjusted to, the same magnitude.

These and other objects are accomplished by combining the outputs of a pair of signal sources in such a manner as to obtain a first and second signal. The first signal has a magnitude equal to the sum and the second a magnitude equal to the difference of the levels of the outputs of the signal sources. The first and second signals are then multiplied together to obtain a product signal. The latter is averaged, so that its noncorrelated components are substantially zero, and is then applied to an arrangement for indicating the level of the output of one source relative to that of the other.

Figure 1:
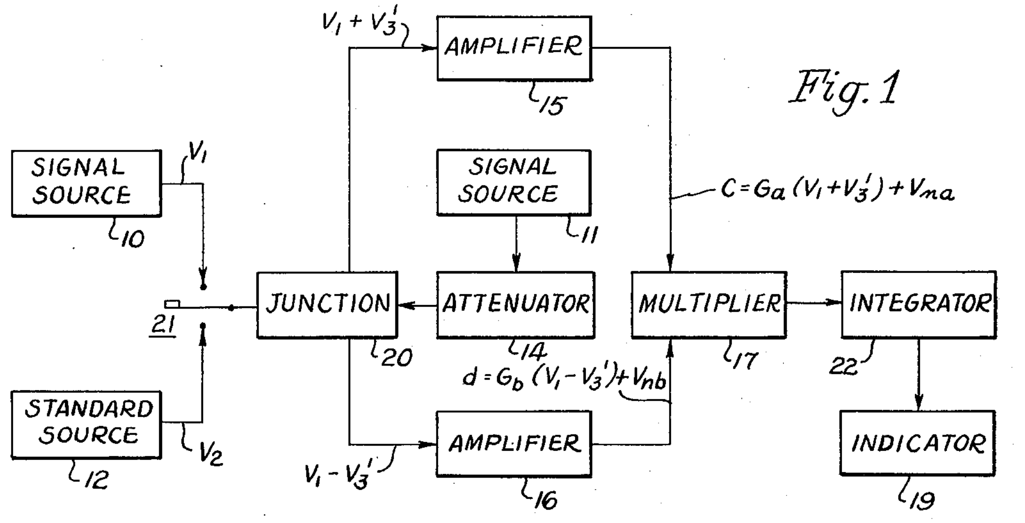
FIG. 1 is a first embodiment.

Referring to FIG. 1, signal sources 10, 11, and standard source 12 may be selected from sources known in the art to provide any one of a variety of signals, such as random noise, pulse signals, or CW. The output levels of the three sources are constant over the measuring time. For precision results, attenuator 14 may be an accurate piston attenuator, although small changes in the output level of source 11 may be determined by various other means.

There is some advantage in having amplifiers 15 and 16 similar, though this is not necessary. The amplifiers should be linear. At least the frequency components produced by the nonlinearity should be prevented from reaching the input to multiplier 17. For some modes of system operation, it is essential for the pass-band characteristic of amplifiers 15 and 16 to remain constant during a measurement, while the gain can vary. This is what primarily happens in an amplifier as the mutual conductance of the vacuum tubes varies. The stability of the pass band can be enhanced by keeping the amplifier broad-banded except for stable-band limiting devices.

Multiplier 17 forms the product between two input voltages, and the output of the multiplier, which is this product, passes through integrator 22 to indicator 19. This permits only the D.C. and very low frequency components of the output of multiplier 17 to reach the indicator. It is understood that the integrator and multiplier could be a single inegral unit, and that instead of integrator 22 a low pass filter could be used.

The product of two or more noncorrelated signals, such as those obtained from noise sources, have substantially zero average values. This means that the noncorrelated components in the output of multiplier 17, when integrated over a sufficiently long period, will be substantially zero. Similarly, if the output of the multiplier is passed through a filter having a cut-off sufficiently close to zero, the noncorrelated components in the output of the filter will be substantially zero.

Figure 2:
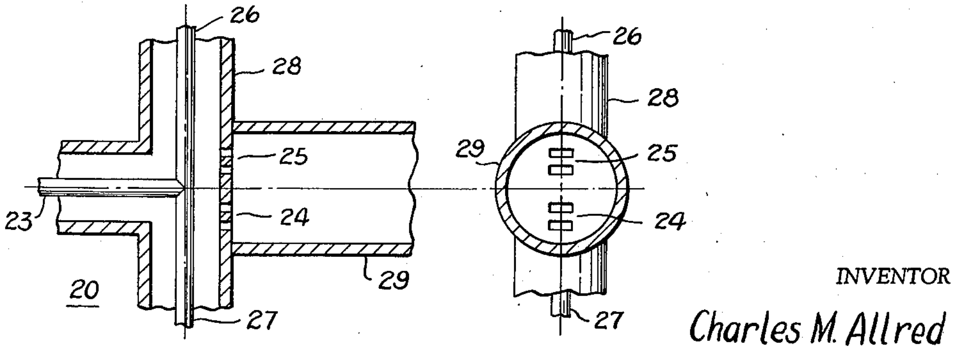
FIG. 2 is a detail drawing of the junction used in FIGS. 1 and 3.

Junction 20, shown in detail in FIG. 2, is a low-loss symmetrical coaxial T. Opposite to where center leg 23 joins the T, slits 24 and 25, positioned substantially perpendicular to the longitudinal axis of side arms 26 and 27, are cut into outer conductor 28. The slits are placed symmetrically on the T. Junction 20 is connected to attenuator 14 so that the fields ($TE_{11}$ mode) within the attenuator's waveguide 29 impringes upon the slits. In effect, the junction acts as a center-tapped secondary of a transformer. The arm of switch 21 is connected through leg 23 to this center tap, while arms 26 and 27 are connected to amplifiers 15 and 16, respectively.

In operation, when the arm of switch 21 is connected to signal source 10, voltage $V_1$ is applied through junction 20 to the inputs of amplifiers 15 and 16. The output of source 11 is applied through attenuator 14 to junction 20, which develops voltages $V'_3$ and $-V'_3$. The latter are applied to the inputs of amplifiers 15 and 16, respectively. Signal *c*, applied to an input of multiplier 17, is equal to $G_a(V_1+V'_3)+V_{na}$, and signal *d*, applied to another input of multiplier 17, is equal to $$G_b(V_1-V'_3)+V_{nb}$$

where $V_{na}$ and $V_{nb}$ represent noise arising in amplifiers 15 and 16, respectively, and $G_a$, $G_b$ are dependent upon the amplification of amplifiers 15 and 16, respectively.

The output of multiplier 17 is:

$$G_a(V_1+V'_3)+V_{na})(G_b(V_1-V'_3)+V_{nb})$$

Since the time average of the noncorrelated components in the latter signal are substantially zero, the output of integrator 22 is:

$$G_aG_b(V_1^2-V'^2_3)$$

Thus, when attenuator 14 is adjusted to provide a zero reading on indicator 19: $V_1^2=V'^2_3$.

In a similar manner, when the arm of switch 21 is connected to standard source 12 and attenuator 14 is adjusted to provide a zero reading on indicator 19: $V_2^2=V''^2_3$, where $V_2$ is equal to the output of source 12 and $V''_3$ is equal to an output of attenuator 14.

The ratio between the outputs of signal sources 10 and 12, $V_1/V_2$, is equal to $V'_3/V''_3$. This ratio is determined from the two settings of attenuator 14 whose insertion loss is therefore immaterial.

Figure 3:
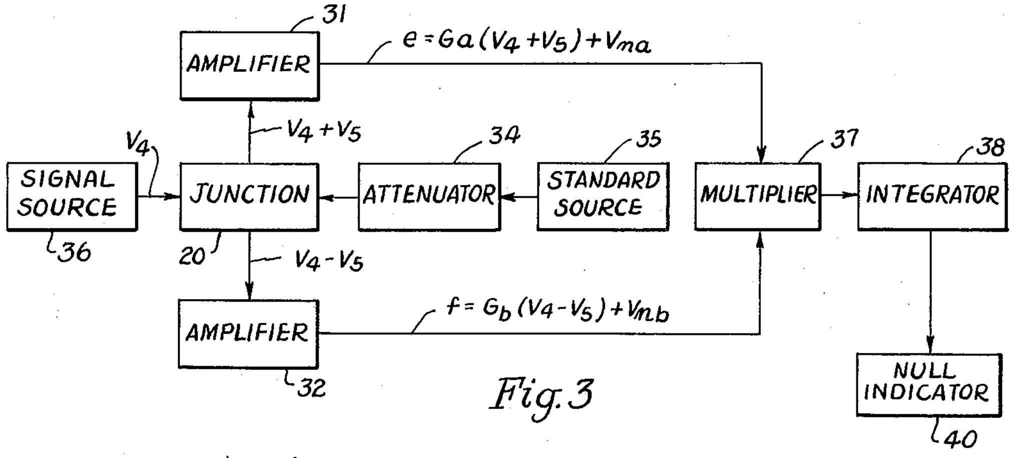
FIG. 3 is a second embodiment of the present invention.

Referring to FIG. 3, amplifiers 31, 32 and attenuator 34 are similar in construction to amplifiers 15, 16 and attenuator 14, respectively. Signal source 36 is applied to the center tap of junction 20, while amplifiers 31, 32 are connected to arms 26 and 27, respectively.

In operation, voltage $V_4$, derived from signal source 36, is applied to amplifiers 31 and 32. The output of standard source 35 is applied through attenuator 34 to junction 20. The junction develops voltages $V_5$ and $-V_5$ which are applied to the inputs of amplifiers 31 and 32, respectively.

Signal $e$, applied to one input of multiplier 37, is equal to $G_a(V_4+V_5)+V_{na}$ and signal $f$, applied to another input of the multiplier, is equal to $G_b(V_4-V_5)+V_{nb}$, where $G_a$ and $G_b$ are dependent upon the amplification of amplifiers 31 and 32, respectively, and $V_{na}$ and $V_{nb}$ are the respective noise signals of the amplifiers.

The output of multiplier 37 is:

$$(G_a(V_4+V_5)+V_{na})(G_b(V_4-V_5)+V_{nb})$$

Thus the output of integrator 38, which is applied to null indicator 40, is equal to $G_aG_b(V_4^2-V_5^2)$.

When attenuator 34 is adjusted to provide a null reading on indicator 40: $V_4^2=V_5^2$ or $V_4=V_5$.

What is claimed is:

1. In a system for comparing the level of a first signal with that of a second signal, means for combining said first and second signal in such a manner as to obtain a third and fourth signal, the third signal having a magnitude substantially equal to the sum and the fourth signal a magnitude substantially equal to the difference of the levels of said first and second signal, means for multiplying said third and fourth signal together to obtain a product signal, means for averaging said product signal over a selected time interval whereby its noncorrelated components are substantially zero, and an indicator connected to said last-mentioned means.

2. In a system for comparing the level of a first signal with that of a second signal, a junction comprising a first inner conductor positioned in a first hollow member of conductive material, a second inner conductor positioned in a second hollow member of conductive material, said second member having an opening in its surface, means for connecting one end of said first member around said opening and said first conductor to said second conductor thereby forming a symmetrical T, a plurality of slits positioned in said second member substantially perpendicular to the longitudinal axis of said second conductor and symmetrically on said T; means for coupling said first signal through said slits and said second signal to said first conductor; means for multiplying together the signals appearing on one end and on the other end of said second conductor to obtain a product signal; means for averaging said product signal over a selected time interval whereby its noncorrelated components are substantially zero; and an indicator connected to said last-mentioned means.

3. In a system for comparing the level of a first signal with that of a second signal, means for combining said first and second signal in such a manner as to obtain a third and fourth signal, the third signal having a magnitude substantially equal to the sum and the fourth signal a magnitude substantially equal to the difference of the levels of said first and second signal, a first and second amplifier, means for applying said third and fourth signal to said first and second amplifier, respectively, means for multiplying the output signal of the first and second amplifiers together to obtain a product signal, means for averaging said product signal over a selected time interval whereby its noncorrelated components are substantially zero, and an indicator connected to said last-mentioned means.

4. In a system for comparing the level of the signal developed by a first source with the level of the signal developed by a second source, an attenuator connected to the output of said first source, the second source providing a first output signal and the attenuator a second output signal, means for combining said first and second output signal in such a manner as to obtain a third and fourth signal, the third signal having a magnitude substantially equal to the sum and the fourth signal a magnitude substantially equal to the difference of the levels of said first and second output signals, means for multiplying said third and fourth signal together to obtain a product signal, means for averaging said product signal over a selected time interval whereby its noncorrelated components are substantially zero, and an indicator connected to said last-mentioned means.

5. In a system for comparing the level of the signal developed by a standard signal source with the level of the signal developed by a signal source, an attenuator connected to the output of said standard source, said signal source providing a first output signal and said attenuator a second output signal, means for combining said first and second output signal in such a manner as to obtain a third and fourth signal, the third signal having a magnitude substantially equal to the sum and the fourth signal a magnitude substantially equal to the difference of the levels of said first and second output signals, a first and second amplifier, means for applying said third and fourth signal to the input of said first and second amplifier, respectively, a multiplier connected to the output of said first amplifier and the output of said second amplifier, means connected to the output of said multiplier for averaging its output signal over a selected time interval whereby the noncorrelated components of the latter signal are substantially zero, and an indicator connected to said last-mentioned means.

6. In a system for comparing the level of the signal developed by a standard source with the level of the signal developed by a signal source, an attenuator connected to the output of said standard source; a junction comprising a first inner conductor positioned in a first hollow member of conductive material, a second inner conductor positioned in a second hollow member of conductive material, said second member having an opening in its surface, means for connecting one end of said first member around said opening and said first conductor to said second conductor thereby forming a symmetrical T, a plurality of slits positioned in said second member perpendicular to the longitudinal axis of said second conductor and symmetrically on said T; means for coupling the output of said attenuator through said slits and the output of said signal source to said first conductor; a first and second amplifier connected to one end and the other end of said second conductor, respectively; a multiplier connected to the output of said first amplifier and the output of said second amplifier; means connected to the output of said multiplier for averaging its output signal over a selected time interval whereby the noncorrelated components of the latter signal are substantially zero; and an indicator connected to said last-mentioned means.

7. In a system for comparing the level of the signal developed by a standard source with the level of the signal developed by a first source, a second signal source, an attenuator connected to the output of said second source, junction means for combining a first and second signal in such a manner as to obtain a third and fourth signal, the third signal having a magntiude substantially equal to the sum and the fourth signal a magnitude substantially equal to the difference of the levels of said first and second signals, means for coupling the output of said attenuator to said junction means, means for selectively connecting said first and standard source to said junction means, a first and second amplifier, means for applying said third and fourth signal to the input of said first and second amplifier, respectively, a multiplier connected to the output of said first amplifier and the output of said second amplifier, means connected to the output of said multiplier for averaging its output signal over a selected time interval whereby the noncorrelated components of the latter signal are substantially zero, and an indicator connected to said last-mentioned means.

References Cited by the Examiner

UNITED STATES PATENTS

| | | | |
|---|---|---|---|
| 2,631,279 | 11/52 | Bollinger et al. | |
| 3,017,505 | 1/62 | Clapp | 328—147 X |
| 3,064,253 | 11/62 | Kirkpatrick. | |
| 3,064,254 | 11/62 | Dickey | 343—16 X |
| 3,078,453 | 2/63 | McGillem et al. | 235—181 X |

MALCOLM A. MORRISON, *Primary Examiner*.